US012638400B2

(12) United States Patent
Meissner et al.

(10) Patent No.: US 12,638,400 B2
(45) Date of Patent: May 26, 2026

(54) METHOD FOR MONITORING AND/OR CONTROLLING PHASE SEPARATION IN CHEMICAL PROCESSES AND SAMPLES

(71) Applicant: BASF SE, Ludwigshafen am Rhein (DE)

(72) Inventors: Jens Meissner, Ludwigshafen (DE); Behrang Shafei, Ludwigshafen (DE); Khushmeen Sakloth, Iselin, NJ (US); Wolfgang Schrof, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 362 days.

(21) Appl. No.: 18/267,598

(22) PCT Filed: Dec. 17, 2021

(86) PCT No.: PCT/EP2021/086615
§ 371 (c)(1),
(2) Date: Jun. 15, 2023

(87) PCT Pub. No.: WO2022/129588
PCT Pub. Date: Jun. 23, 2022

(65) Prior Publication Data
US 2024/0053274 A1     Feb. 15, 2024

(30) Foreign Application Priority Data
Dec. 17, 2020     (EP) ..................................... 20215143

(51) Int. Cl.
*G01N 21/84*     (2006.01)
*G01N 31/02*     (2006.01)
(Continued)

(52) U.S. Cl.
CPC ............. *G01N 21/84* (2013.01); *G01N 31/02* (2013.01); *G06T 7/13* (2017.01); *G06T 11/00* (2013.01); *G01N 2021/8405* (2013.01)

(58) Field of Classification Search
None
See application file for complete search history.

(56) References Cited

U.S. PATENT DOCUMENTS 10,706,626 B1 * 7/2020 Brent ................... B01J 19/0006
11,978,181 B1 * 5/2024 Pieper .................. H04N 23/617
(Continued)

FOREIGN PATENT DOCUMENTS

NO       2019139922 A1     7/2019
WO       2016142675 A1     9/2016

OTHER PUBLICATIONS

Eppel Sagi et al: "Computer vision-based recognition of liquid surfaces and phase boundaries in transparent vessels, with emphasis on chemistry applications" Apr. 28, 2014 (Apr. 28, 2014), pp. 1-36.
(Continued)

*Primary Examiner* — Michelle M Entezari Hausmann
(74) *Attorney, Agent, or Firm* — Lowenstein Sandler LLP

(57)       ABSTRACT

The present invention relates to determining phase information of a fluid sample. At least one image of the fluid sample including the phase information of the fluid sample is provided. Additionally, a data driven model which comprises at least one output channel for the phase information is provided. The at least one output channel includes at least one output channel for classifying a boundary between two phases of the fluid sample, such that the phase information includes information about a property of the boundary between the two phases, such as a height, a volume, a type, or a strength of the boundary. The phase information of the fluid sample is derived based on the data driven model and
(Continued)

the at least one image of the fluid sample including the phase information of the fluid sample.

15 Claims, 10 Drawing Sheets

(51) Int. Cl.
G06T 7/13 (2017.01)
G06T 11/00 (2026.01)

(56) References Cited

U.S. PATENT DOCUMENTS

| | | | | |
|---|---|---|---|---|
| 2009/0306311 | A1* | 12/2009 | Reed | G01N 21/82 |
| | | | | 422/119 |
| 2020/0158745 | A1* | 5/2020 | Tian | G06V 10/454 |
| 2020/0231426 | A1* | 7/2020 | Edwards | B67D 1/0888 |
| 2021/0064927 | A1* | 3/2021 | Kluckner | G06N 3/045 |

OTHER PUBLICATIONS

Sagi Eppel: "Setting an attention region for convolutional neural networks using region selective features, for recognition of materials within glass vessels", arxiv.org, Aug. 29, 2017 (Aug. 29, 2017), pp. 1-20.

Ronneberger et al., "U-Net: Convolutional Networks for Biomedical Image Segmentation", Computer Science Department and BIOSS Centre for Biological Signalling Studies, University of Freiburg, May 18, 2015, 8 pages.

Debevec et al. "Recovering High Dynamic Range Radiance Maps from Photographs" University of California at Berkeley 2008, Article No. 31, 10 pages.

International Search Report and Written Opinion for Application No. PCT/EP2021/086615 mailed on Feb. 24, 2022, 12 pages.

* cited by examiner

400A 401 402 403 404 405 406 407 408 409 410 411 412

402A

400

400B

400

402B

500

520

510

502

530

600A

600B

602A

602B

700

704

702

800

804

802

40 42 44 52

93

95

1000

METHOD FOR MONITORING AND/OR CONTROLLING PHASE SEPARATION IN CHEMICAL PROCESSES AND SAMPLES

CROSS-REFERENCE TO RELATED APPLICATION(S)

The present application is a national phase entry under 35 U.S.C. § 371 of International Application No. PCT/EP2021/086615, filed on Dec. 17, 2021, which claims priority to European Patent (EP) Application No. 20215143.7 filed on Dec. 17, 2020. The contents of these applications are hereby incorporated by reference herein in their entirety.

FIELD OF THE INVENTION

The present invention relates to a phase analysis system for determining phase information of a fluid sample, a method for determining phase information of a fluid sample, a use of the phase information of the fluid sample obtained by the method, a use of the method for monitoring a fluid sample, and a computer program product for determining phase information of a fluid sample.

BACKGROUND OF THE INVENTION

Image segmentation allows separating different segments of an image. In "U-Net: Convolutional Networks for Biomedical Image Segmentation" by O. Ronneberger et al., in arXiv: 1505.04597v1 [cs.CV], image segmentation of biomedical images is presented based on a convolutional neural network (CNN). The U-net architecture is a so-called fully convolutional network in which a usual contracting network is supplemented by successive layers where pooling operators are replaced by upsampling operators. In the U-net architecture, the expansive path is more or less symmetric to the contracting path. The U-net is inter alia applied for separation of touching objects of the same class. Border pixels are learned by pre-computing a weight map for each ground truth segmentation with a pixelwise loss weight. The pre-computed weight maps are incorporated into the loss function.

Many products and formulations, such as mixtures, solutions, foams, emulsions, dispersions and suspensions, are not in a thermodynamic equilibrium and will separate over time into the single components. This phase separation, e.g., into hydrophobic-hydrophilic liquids, into solid-liquid, and liquid-gas, may be wanted or unwanted and receives a strong research interest. Typically, formulations consist of many ingredients which opens a huge parameter field to adjust the phase stability by the concentration of the ingredients or the order of addition or physical treatment of the sample, e.g., by heating, mixing, etc. This usually results in huge experiments with many samples which are prepared and analysed using a semi-automatic approach including automatic machines and human visual inspection. One huge bottle neck in this research process is the analysis of the measured data by humans or simplified automatic processes. But also, in production of bulk material the status of phase stability or phase separation is important to know and/or control.

For fluid samples in which two immiscible compounds are combined a phase separation may be observed over time. Determining different phases in the fluid sample may be performed by a human user that observes the fluid sample over time and labels different emerging phases. Various images may be recorded over time and visually inspected by the human user. The visual inspection allows the human user to distinguish between different phases. A measuring scale can be used for determining a height of the respective phases. The human user can then input the data into a database for further processing it.

In "Computer vision-based recognition of liquid surfaces and phase boundaries in transparent vessels, with emphasis on chemistry applications" published by S. Eppel and T. Kachman as arXiv: 1404.7174v7 [cs.CV] a computer vision method for the recognition of liquid surfaces and liquid levels in various transparent containers is presented. The method receives the image of the liquid container and the boundaries of the container in the image and scans all possible curves that could correspond to the outlines of liquid surfaces in the image. The method then compares each curve to the image to rate its correspondence with the outline of the real liquid surface by examining various image properties in the area surrounding each point of the curve. The image properties that were found to give the best indication of the liquid surface are the relative intensity change, the edge density change and the gradient direction relative to the curve normal. The method, however, has a high miss rate for the boundaries between phase-separating liquids of greater than 10%, caused by emulsions and weak boundaries in such surfaces. Emulsive surfaces are the hardest to recognize due to their unpredictable shape and the blurry boundaries.

SUMMARY OF THE INVENTION

It can be seen as an object of the present invention to provide a phase analysis system for determining phase information of a fluid sample, a method for determining phase information of a fluid sample, a computer program product for determining phase information of a fluid sample, and a computer-readable medium which allow to improve determination of phase information of a fluid sample. The phase information obtained in this manner may be used for various optimisation activities, for example, optimising phase stability. The method may be used for monitoring a fluid sample, for example, an evolution of the fluid sample over time.

In a first aspect of the present invention a phase analysis system for determining phase information of a fluid sample is presented. The phase analysis system is configured for providing at least one image of the fluid sample including the phase information of the fluid sample, providing a data driven model comprising at least one output channel for the phase information, wherein the at least one output channel includes at least one output channel for classifying a boundary between two phases of the fluid sample, such that the phase information includes information about a property of the boundary between the two phases, and deriving the phase information of the fluid sample based on the data driven model and the at least one image of the fluid sample including the phase information of the fluid sample.

Since the phase information of the fluid sample is derived based on the data driven model and the at least one image of the fluid sample including the phase information of the fluid sample, no manual visual inspection of the fluid sample is required. The phase analysis system allows to perform an improved computer vision inspection of the fluid sample for deriving the phase information. In contrast to computer vision based inspection methods known from the prior art, the data driven model, for example, allows reducing a miss rate for boundaries. This allows to reduce imprecise measurements and errors caused by human visual inspection or computer vision based inspection known from the prior art, thus enhancing precision of the measurements. Furthermore, more phase information may be derived. Additionally, the phase information may be better comparable to phase information obtained for other fluid samples.

The phase information includes information regarding phases of the fluid sample including the information about a property of the boundary between the two phases of the fluid sample. The phase information may include additional information regarding the phases of the fluid sample, e.g., how many or which type of phases are present in the fluid sample.

Since the data driven model comprises at least one output channel for the phase information, of which at least one output channel is configured for classifying a boundary between the two phases of the fluid sample, the phase information includes at least information about a property of the boundary between the two phases. This allows the phase analysis system an improved monitoring and/or controlling of phase separation as phase information including properties of the boundaries between different phases as well as properties of the phases may be determined.

Generally, each property, for instance, each optical characteristic of the boundary in the image, can be regarded as providing an additional dimension to the boundary. For example, the providing of a simple position can be regarded as a first dimension, providing further an extent of the boundary a second dimension and providing an intensity of the boundary a third dimension. Thus, not only the position of the boundary is provided but also the properties of the boundary are provided. This also allows to recognize unclear or difficult to determine boundaries, to draw conclusion on formulas of the liquid sample, or recognize the appearance of emulsions. In particular, emulsions often only provide very unclear phase boundaries, such that algorithms only referring to one dimension of the property will fail to predict the boundary correctly. Thus, the invention also allows to draw conclusions on the stability of emulsions, and can thus be applied to optimize the use of emulsifiers in groceries, personal care products, etc.

Furthermore, the phase analysis system may allow an automatic analysis of phase stability status of long-term storage fluid samples. For example, foam stability of cleaning detergents or personal care products may be automatically analysed. The phase analysis system may allow to reduce data analysis effort, which may result in analysing more samples in the same time, increasing efficiency of the analysis such that a faster time to market may be achieved.

A boundary or border, respectively, between two phases corresponds to a transitional region between opposing interfaces of two neighboring phases. Classifying a boundary between two phases of the fluid sample means that one or more properties of the boundary are classified, e.g., including a volume of the boundary, a strength of the boundary, a type of the boundary, or any other property that allows to classify the boundary. The type of the boundary may be, for example, sharp or blurry. A sharp boundary may be defined, for example, as a boundary with a height which is below a threshold height and a blurry boundary may be defined, for example, as a boundary with a height which is above a threshold height. Whether a boundary is sharp or blurry may depend on, for example, the phases between which the boundary is arranged. For example, liquid-air boundaries may be sharp, while boundaries between two liquid phases with similar absorbance and refractive indices and high interphase miscibility may be blurry. For example, phase boundaries between emulsions, i.e., emulsive phase boundaries, may occur over a wider height instead of forming a thin boundary line, i.e., in the at least one image of the fluid sample including the phase information of the fluid sample, there is no sharp intensity change between the phases to be identified. Instead, a weak change over a wider height is provided. Furthermore, surfaces of the boundary may not be in equilibrium and therefore do not necessarily minimize their area for forming a flat plane.

The data driven model may comprise a separate output channel for classifying the boundary between the two phases of the fluid sample. This allows an improved determination of phase information of the fluid sample and in particular of one or more properties of the boundary between the two phases.

The phase analysis system may be configured for providing a series of images of the fluid sample of which at least some include a part of the phase information, such that the phase information of the fluid sample may be derived from the series of images. Alternatively, the phase information may also be included in a single image of the fluid sample, e.g., a superimposed image generated by superimposing the series of images.

The phase analysis system may be configured for providing at least two images of the fluid sample obtained at different imaging conditions. Imaging conditions may be based, for example, on exposure time, lighting conditions, angle of incidence on the fluid sample, or any other condition which may influence the image. The different imaging conditions may include, for example, different angles of incidence for light impinging on the fluid sample, different lighting conditions, different exposure times, or any combination thereof. Lighting conditions include, for example, a brightness of the light impinging on the fluid sample. The at least two images of the fluid sample obtained at different imaging conditions may be provided, for example, based on performing bracketing techniques, such as exposure bracketing.

The phase analysis system may be configured for generating the at least one image of the fluid sample including the phase information of the fluid sample by superimposing the at least two images of the fluid sample. In this case, the at least one image of the fluid sample including the phase information of the fluid sample is a superimposed image. The phase information of the fluid may in this case be derived based on the data driven model and the superimposed image. This allows including the information of the images into one image and may reduce processing effort as the data driven model needs to process only the superimposed image instead of the individual images.

The phase analysis system may be configured for superimposing the at least two images of the fluid sample by using, for example, high-dynamic-range-imaging (HDRI) techniques for generating the superimposed image. The superimposed image may be a high-dynamic-range (HDR) image. The phase analysis system may be configured for superimposing, for example, 12 images for generating the superimposed image. This may allow the superimposed image to contain maximum information.

The different imaging conditions may include different exposure times. The at least two images may be obtained for different exposure times and otherwise identical imaging conditions. Often the samples and phases appear different under different lighting conditions or exposure times. It is therefore beneficial to provide images at different exposure time for otherwise same imaging conditions, e.g., same lighting conditions. By providing at least two images with different exposure time the chance is greatly enhanced that at least one image contains information related to a phase and/or boundary between the phases of the fluid sample. Superimposing of the at least two images with different exposure time but otherwise same imaging conditions allows generating a single image containing all information of the individual images, i.e., this allows to incorporate all information into a single image. This information may be used, for example, together with information about the experimental setup for obtaining the at least two images, e.g., an image sensor resolution, image sensor to fluid sample distance etc., to determine phase information such as a height of each individual phase and boundary, as well as its volume, in case that the fluid sample is contained in a vial of constant inner volume along its longitudinal axis.

The phase analysis system may be configured for providing at least two images of the fluid sample obtained at different exposure times for otherwise identical imaging conditions. This may allow to improve the chances that at least one of the images includes phase information related to a phase, boundary, and/or interfaces between phases of the fluid sample.

Generally, the information about the property of the boundary can refer to any information that is identifiable and/or labeled in the image. In particular, the information can refer to any geometrical and/or intensity information. The information about the property of the boundary between the two phases may include one or more of:

a height of the boundary between the two phases of the fluid sample, a volume of the boundary between the two phases of the fluid sample, a strength of the boundary between the two phases of the fluid sample, and a type of the boundary between the two phases of the fluid sample.

In this context, the height can refer also to a position of the boundary in the fluid sample, for instance, to a distance between the bottom of a container comprising the fluid sample and the beginning of the boundary. The strength of the boundary can refer in this context to a distinctness or recognisability of the boundary in the image. In particular, the recognisability can be measure of the probability with which the model can derive the presence of a boundary at a respective position. The information about the property of the boundary between the two phases may be time dependent such that each of height, volume, strength, and type may be time dependent and the phase information may include one or more of them for different points in time.

The phase information may additionally include one or more of:

a number of different phases of the fluid sample, a type of one or more of the phases of the fluid sample, one or more gradients in one or more of the phases of the fluid sample, a turbidity of the fluid sample, a turbidity at a specific position of the fluid sample, a position of one or more interfaces between different phases of the fluid sample, height of one or more of the phases of the fluid sample, a volume of one or more of the phases of the fluid sample, and a bubble size distribution in case that one of the phases of the fluid sample is a foam.

The phase information may be time dependent such that each of the aforementioned parameters may be time dependent and the phase information may include one or more of them for different points in time, for example, a turbidity of the fluid sample over time, a height of one or more of the phases of the fluid sample over time, etc.

Types of phases of the fluid sample may include, for example, a turbid phase, a surface phase, a gradient phase, a foam phase, an ill-defined phase, an air phase, a bubble phase, and a transparent phase. A foam includes, one or more bubbles or air droplets, respectively.

The data driven model may comprise a single model including output channels for phases and boundaries of the phases.

The at least one output channel may include, for example, an output channel for each type of phase to be classified by the phase analysis system. The data driven model may include a separate output channel for classifying each type of phase to be classified by the phase analysis system.

The data driven model may be a neural network. The neural network may be trained based on labeled training data of fluid samples. The labeled training data may include the phase information of the fluid samples. The neural network may be a convolutional neural network (CNN), e.g., a fully-convolutional neural network (FCN). The neural network may be, for example, a deep neural network for image segmentation, e.g., based on U-net as published in "U-Net: Convolutional Networks for Biomedical Image Segmentation" by O. Ronneberger et al., in arXiv: 1505.04597v1 [cs.CV]. In contrast to the U-net known from "U-Net: Convolutional Networks for Biomedical Image Segmentation" by O. Ronneberger et al., in arXiv: 1505.04597v1 [cs.CV], the data driven model includes at least one output channel for classifying a boundary between two phases of the fluid sample, such that the phase information includes information about a property of the boundary between the two phases, this allows to not only derive phase information regarding to which phase a pixel belongs, but also a probability of a pixel being a boundary pixel. This may allow to distinguish phases of a same type, e.g., two liquid phases, that are next to each other. Furthermore, an indication of a strength of the boundary may be provided.

Alternatively, or additionally, the phase analysis system may be configured for classifying boundaries according to their height, or thickness, or width, respectively. The output channel for the boundary may be trained on boundaries of arbitrary height. This may allow classifying thicker boundaries, e.g., in case of a smooth phase transitions.

The phase analysis system may comprise a light source, an image sensor, and a processor. The light source may be configured for providing incident light to the fluid sample. The image sensor may be configured for providing one or more images of the fluid sample. The phase analysis system may be configured for providing the at least one image of the fluid sample including the phase information of the fluid sample based on the one or more images of the fluid sample provided by the image sensor. The processor may be configured for deriving the phase information based on the data driven model and the at least one image of the fluid sample including the phase information of the fluid sample.

The phase analysis system may be configured for providing incident light to the fluid sample from different angles. The image sensor may be, for example, a camera. The phase analysis system may be configured for providing incident light to the fluid sample and receiving the light after interacting with the fluid sample, for example, for 3 different angles, e.g., including reflection, transmission, and stray light. The phase analysis system may be configured for providing, for example, 12 exposures of the light for each angle. The exposures may have different exposure time. This may allow to obtain several images including more phase information. The phase analysis system may include two or more image sensors, e.g., arranged at different angles of incidence. This may allow obtaining several images in parallel. Each of the image sensors may obtain an image of the fluid sample using a different exposure time.

The phase analysis system may include a computer-readable medium storing a database, such as a data lake or an electronic lab notebook (ELN). The computer-readable medium may be included in a local phase analysis unit including the light source, image sensor and the processor. Alternatively, the database may be stored on a server which forms part of the phase analysis system. The local phase analysis unit may include a communication interface configured for connecting to the server. The database may store a phase analysis algorithm including the data driven model. In case that the database is stored on the server, images of different local phase analysis units may be uploaded to the server for determining phase information of different fluid samples. This may allow a unified processing for different processing sites while more data may be extracted. Storing the data centrally, may allow to improve the phase analysis algorithm, e.g., if it is trained on the fly, for example, by online machine learning. Using only a single phase analysis algorithm for different fluid samples handled by different robotic systems may furthermore improve comparability between, e.g., phase stability of the fluid samples, for different robotic systems. The phase analysis system may be operated time and/or cost efficient as time and/or costs may be saved for determining the phase information.

The phase analysis system may be configured for providing the at least one image of the fluid sample including the phase information of the fluid sample as image or images with highest contrast compared to other images of the fluid sample, e.g., selecting an image with a highest contrast of the one or more images provided by the image sensor as the image including the phase information of the fluid sample.

Alternatively, the phase analysis system may be configured for selecting at least two optimal images of the at least two images with an optimal contrast. The phase analysis system may be configured for deriving the phase information from the at least two optimal images. The optimal images correspond to the images which are selected to be images with optimal, i.e., highest, contrast. The optimal images may be selected, for example, by comparing contrasts of the at least two images of the fluid sample obtained at different imaging conditions and selecting a predetermined number of images with highest contrasts, such as 12 images. Alternatively, all images with a contrast above a threshold contrast value or with a contrast above a threshold contrast ratio compared to the image with the highest contrast, e.g., 70% of the contrast of the image with the highest contrast, may be selected as optimal images. This allows discarding images with inferior information and to select only images with superior information for further processing. This may allow reducing processing effort. The optimal images may be superimposed for generating the superimposed image.

The phase analysis system may be used, for example, in any production plant requiring automatic and unbiased characterization of optical product quality. Furthermore, the phase analysis system may be used for monitoring certain processing steps, e.g., indicating finishing of a separation step during product refinement. The phase analysis system may also be used for controlling phase separation.

In a further aspect of the invention, a method for determining phase information of a fluid sample is presented. The method may be a computer implemented method. The method comprises the steps:

providing at least one image of the fluid sample including the phase information of the fluid sample, providing a data driven model comprising at least one output channel for the phase information, wherein the at least one output channel includes at least one output channel for classifying a boundary between two phases of the fluid sample, such that the phase information includes information about a property of the boundary between the two phases, and deriving the phase information of the fluid sample based on the data driven model and the at least one image of the fluid sample including the phase information of the fluid sample.

If the method is a computer implemented method, the steps of the computer implemented method may be performed by a computer system including a processor and a communication interface which, for example, includes a transceiver and an antenna array. The computer system may be, for example, the phase analysis system or a part of the phase analysis system.

The step, providing at least one image of the fluid sample including the phase information of the fluid sample may be performed via the communication interface. The step, providing a data driven model comprising at least one output channel for the phase information, wherein the at least one output channel includes at least one output channel for classifying a boundary between two phases of the fluid sample, such that the phase information includes information about a property of the boundary between the two phases may be performed by the processor. The step, deriving the phase information of the fluid sample based on the data driven model and the at least one image of the fluid sample including the phase information of the fluid sample may be performed by the processor.

Additionally, the method may comprise one or more of the steps:

providing, e.g., via the communication interface, at least two images of the fluid sample obtained at different imaging conditions, generating, e.g., with the processor, the at least one image of the fluid sample including the phase information of the fluid sample by superimposing the at least two images of the fluid sample, obtaining, e.g., via the communication interface, the at least two images of the fluid sample at different exposure times for otherwise identical imaging conditions, providing the data driven model such that the data driven model comprises a single model including output channels for phases and boundaries of the phases, training the data driven model based on labeled training data of fluid samples, wherein the labeled training data include the phase information of the fluid samples, causing a light source to provide incident light to the fluid sample, causing an image sensor to provide one or more images of the fluid sample, and providing the at least one image of the fluid sample including the phase information of the fluid sample as image with a highest contrast compared to other images of the fluid sample.

One or more of the aforementioned steps may be performed by the computer system, e.g., with the processor or via the communication interface, if the method is computer implemented.

The method may also, for example, comprise the step: providing a separate layer for classifying the boundary between the two phases of the fluid sample.

The method may also, for example, comprise the step: training the data driven model without supervised learning, e.g., based on a heuristic approach.

A heuristic approach may, for example, determine the phase information based on a computer vision method known from the prior art which determines phases based on, for example, a relative intensity change and/or an edge density change in the fluid sample. The computer vision method known from the prior art may be, for example, the computer vision method disclosed in "Computer vision-based recognition of liquid surfaces and phase boundaries in transparent vessels, with emphasis on chemistry applications" published by S. Eppel and T. Kachman as arXiv: 1404.7174v7 [cs.CV].

In a further aspect a use of the phase information obtained by the method according to claim 10 or 11, or any embodiment of the method, for optimizing a property of the fluid sample is presented. The use of the phase information may include, for example, one or more of:

optimizing a foam volume of the fluid sample,
optimizing a foam height of the fluid sample,
optimizing a phase stability of the fluid sample, and
optimizing shelf life of the fluid sample.

For example, the foam height of the fluid sample may be analysed in order to optimize, e.g., maximize or minimize, the foam volume produced in fluid samples including personal care, hand-wash, dish-wash, or industrial cleaning formulations. In particular, a stability of the foam or phase under room temperature conditions can also be optimized utilizing the above described method.

The phase stability of the fluid sample may be optimized, for example, based on changing the formulation of the fluid sample and monitoring the fluid sample over time in order to derive the phase information. The formulation of the fluid sample may include concentration of different components forming the fluid sample. In other words, the phase stability of fluid samples including solutions, suspensions, emulsions, suspoemulsions, etc. may be analysed in order to screen an effect one or more additives have when added to the fluid sample in different concentrations. This may allow optimizing formulations or products, respectively, such as agricultural, paint, varnish, personal care, or industrial cleaning formulations.

The phase information may furthermore be used for other self optimization activities. The phase information may be included in a searchable database. The phase information may be processed in order to include numerical and/or categorical information about the phases obtained from the images of the fluid samples. The searchable database may be, for example, a data lake, an ELN, or any other searchable database.

In a further aspect a use of the method according to claim 10 or 11, or any embodiment of the method, for monitoring a fluid sample is presented. The use of the method may include one or more of:

monitoring emulsion-polymerisation during a reaction within the fluid sample, and
monitoring evolution of the fluid sample over time.

Monitoring emulsion-polymerisation at different times during the reaction may be performed in order to individually define an endpoint of the reaction. Monitoring the evolution of the fluid sample over time, such as long-term, may allow determining a shelf life of products and formulations such as agricultural, paint, varnishes, personal care, or industrial intermediate formulations such as solutions, suspensions, emulsions, or suspoemulsions. The monitoring may be used, for example, for controlling and/or optimizing reactions and evolution of the fluid sample, e.g., by adjusting concentrations of components of the fluid sample, e.g., adjusting the formulations.

In a further aspect of the invention, a method for optimizing a fluid product is presented, wherein the method comprises:

receiving a fluid sample, in particular, a formulation of a product sample, of the fluid product and further receiving technical application details for the fluid product, deriving from the technical application details target properties of boundaries between phases of the fluid sample, utilizing the optimization method as described above for optimizing the fluid product with respect to the technical application details, and producing the optimized fluid product.

Generally, the fluid sample can be received, for instance, in form of a possible final product or a formula for the fluid sample can be provide according to which the fluid sample can be produced. The technical application details can refer to any technical application, like an intended kind of application, an intended application location, what kind of product should be produced, etc. However the technical application details can also be more specific like whether the product should act as emulsifier or demulsifier, how much foam the product should produce, etc. The target properties can then be derived based on knowledge on which properties of a phase boundary are important for the respective intended technical application, for example, predetermined rules and scenarios can be utilized.

In a further aspect of the invention, a computer implemented method for providing a customized training of a data driven model is presented, wherein the method comprises:

receiving, e.g. via a communication user interface, labeled images of fluid samples as labelled training data, wherein the labeled training data include the phase information of the fluid samples, utilizing a training method for training the data driven model, wherein the training method comprises providing the data driven model comprising an output channel for a phase information, wherein the at least one output channel includes at least one output channel for classifying a boundary between two phases of the fluid sample, such that the phase information includes information about a property of the boundary between the two phases, and training the data driven model based on labeled training data of fluid samples, and provide, e.g. via a communication user interface, the trained data driven model and/or provide an indication that the training of the data driven model is complete.

In a further aspect of the invention, a computer implemented method for utilizing a customized trained data driven model is presented, wherein the method comprises:

receiving, e.g. via a communication user interface, sample images of fluid samples, utilizing a trained customized data driven model based on the sample images, wherein the customized data driven model is trained as described above and comprises an output channel for a phase information, wherein the at least one output channel includes at least one output channel for classifying a boundary between two phases of the fluid sample, such that the phase information includes information about a property of the boundary between the two phases, and providing, e.g. via a communication user interface, the phase information including the information about the property of the boundary between the two phases.

In a further aspect a computer program product for determining phase information of a fluid sample is presented. The computer program product comprises program code means for causing a processor to carry out the method according to claim 10 or 11, or any embodiment of the method, when the computer program product is run on the processor.

In another aspect a computer-readable medium having stored the computer program product according to claim 15 or any embodiment of the computer program product is presented.

It shall be understood that the phase analysis system for determining phase information of a fluid sample of claim 1, the method of claim 10, the use of claim 12, the use of claim 13, the computer program product of claim 14, and the computer-readable medium of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
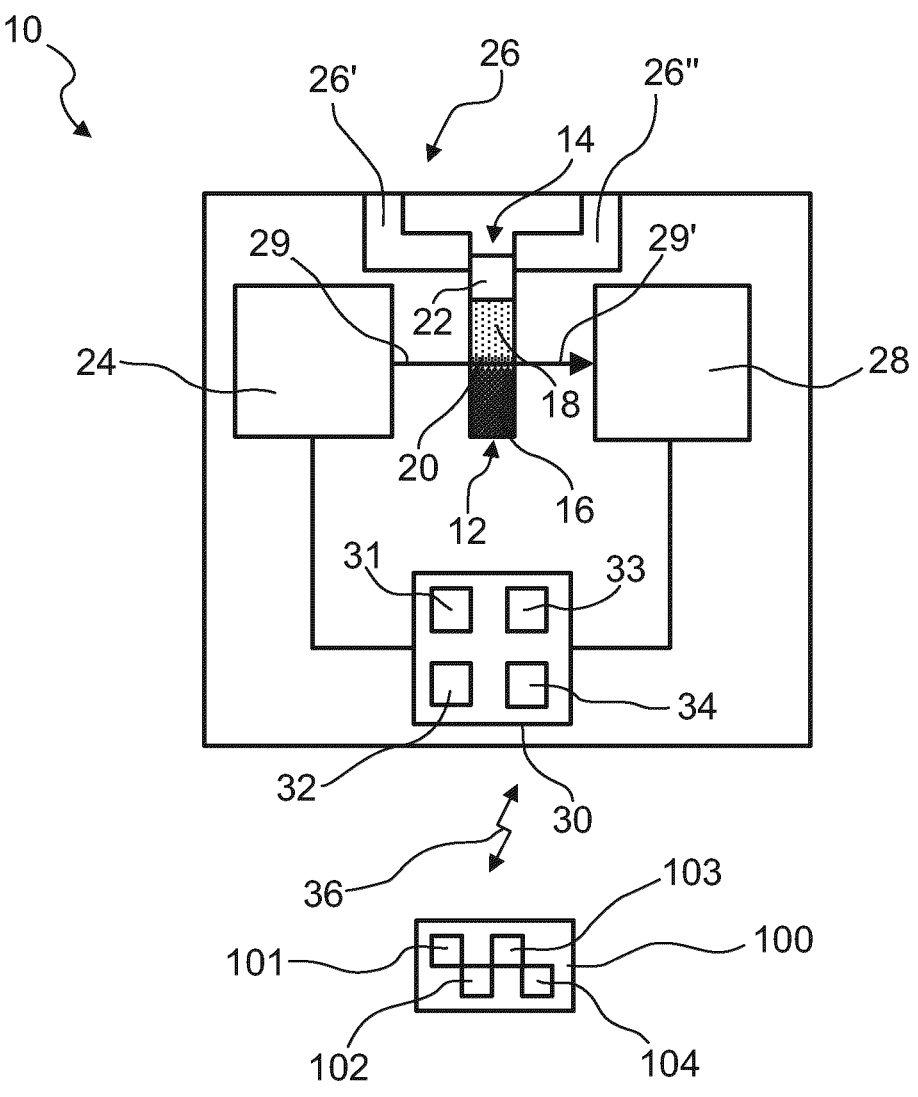
FIG. 1 shows schematically and exemplarily an embodiment of a phase analysis system for determining phase information of a fluid sample.

FIG. 1 shows an embodiment of a phase analysis system 10 for determining phase information of a fluid sample 12. The fluid sample 12 is arranged in a vial 14 with a constant radius along its longitudinal axis. The fluid sample 12 has a first phase 16, a second phase 18, a boundary 20 between the two phases 16 and 18, and an empty headspace with an air phase 22. In other embodiments, the fluid sample may also have a different number of phases and boundaries of the phases.

The phase analysis system comprises a light source in form of lamp 24, a dual arm 26, an image sensor in form of camera 28, a control unit 30, and a server 100. In other embodiments, the light source may be another device, e.g., a light emitting diode (LED) array.

Alternatively, for example, different lamps or LEDs may be arranged at different locations with respect to the fluid sample and the image sensor. The image sensor may also be another device and/or the image sensor may include several cameras arranged, for example, at different relative locations with respect to the fluid sample and the light source.

In this embodiment, the lamp 24 provides incident light 29 to the fluid sample 12. Depending on a relative arrangement of the fluid sample 12, the lamp 24, and the camera 28, the camera 28 may receive light in a transmission configuration, remission configuration, or a stray configuration. In this embodiment, the fluid sample 12 is arranged between the lamp 24 and the camera 28, such that the incident light 29 after interaction with the fluid sample 12 in form of a resulting light 29' is received by the camera 28 in a transmission configuration. In other embodiments, the light source and image sensor may also be arranged, for example, on the same side of the fluid sample such that light is received in a remission configuration. In yet other embodiments, other angles of incidence of the light relative to the camera may be selected in order to provide a stray configuration. The light source and the image sensor may be arranged on moveable arms in order to change the configuration (not shown).

The dual arm 26 has two moveable arms 26' and 26" which can hold and move the vial 14 and arrange it in a position between the lamp 24 and the camera 28, such that the incident light 29 can be provided to the fluid sample 12 from the lamp 24 and the resulting light 29' can be received by the camera 28.

The camera 28 provides a respective image of the fluid sample 12 in reaction to receiving the resulting light 29'. In this embodiment, 12 images with different imaging conditions are obtained by the camera 28. Different imaging conditions may include, for example, different angles of incidence for the light impinging on the fluid sample, different lighting conditions, different exposure times, or any combination thereof. In this embodiment, each of the 12 images is obtained by the camera 28 with a different exposure time and otherwise identical imaging conditions. In other embodiments, at least one image of the fluid sample including the phase information of the fluid sample may be obtained. For example, two or more images of the fluid sample may be obtained at different imaging conditions.

The images obtained by the camera 28 are provided to the control unit 30.

The control unit 30 includes a processor 31, a computer-readable medium in form of memory 32, a transceiver 33, and an antenna array 34. The processor 31 processes data, e.g., it runs algorithms, and performs calculations, while memory 32 stores data and provides them for processing. In particular, the control unit 30 controls the lamp 24 and the camera 28 by adjusting the imaging conditions, e.g., changing the lighting conditions and/or the exposure times with which a certain image is obtained. The control unit 30 then receives the images obtained by the camera 28 and stores them in the memory 32. The transceiver 33 and antenna array 34 form a communication interface which is used for connecting the control unit 30 to the server 100 via a wireless link 36 in order to provide the images of the fluid sample 12 to the server 100 for further processing. In other embodiments, the images of the fluid sample may also be processed by the processor of the control unit.

The server 100 includes a processor 101, a computer-readable medium in form of memory 102, a transceiver 103, and an antenna array 104. The transceiver 103 and antenna array 104 form a communication interface which is used for establishing the wireless link 36 with the control unit 30.

In this embodiment, the memory 102 stores a computer program product for determining the phase information of the fluid sample 12. The computer program product includes program code means for causing processor 101 to carry out a method for determining the phase information of the fluid sample 12, e.g., method 900 presented in FIG. 9, when the computer program product is run on the processor 101. Furthermore, the memory 102 stores images obtained by the camera 28, a data driven model in form of a CNN trained for deriving phase information of the fluid sample 12 based on the images of the fluid sample, labeled training data of fluid samples with phase information, an optimal image selection algorithm, a superpositioning algorithm for generating superimposed images from the images of the fluid sample, and other data used by the phase analysis system 10, e.g., received via the transceiver 103 and antenna array 104.

In this embodiment, processor 101 first runs the optimal image selection algorithm that selects a subset of the 12 images of the fluid samples 12 obtained by the camera 28 with an optimal, i.e., highest, contrast for further processing. Only the subset of the images is used by a superpositioning algorithm in a further processing step for generating a superimposed image by superimposing the subset of the images of the fluid sample. In this embodiment, HDRI techniques are used by the superpositioning algorithm for superimposing the subset of the images. The superimposed image, i.e., the HDR image, may be generated, for example, based on the techniques presented in "Recovering High Dynamic Range Radiance Maps from Photographs" published by P. E. Debevec and J. Malik in SIGGRAPH '08: ACM SIGGRAPH 2008 classes, Article No.: 31, Pages 1-10. For example, an inverse camera response function (CRF) may be estimated by a calibration algorithm and the HDR image, i.e., the superimposed image, may be constructed using Debevec's weighting scheme and the CRF. Optionally, tonemapping may be performed on the HDR image, e.g., if it is also to be displayed to a user. Subsequently, the superimposed image is input to the CNN for determining phase information of the fluid sample 12. The CNN was trained based on labeled training data of fluid samples. The labeled training data include the phase information of the fluid samples. In other embodiments, the CNN may also be trained in any other manner.

The CNN comprises various output channels for the phase information. In this embodiment the CNN is a single model including output channels for phases and boundaries of the phases. In other embodiments, the output channels include at least one output channel for classifying a boundary between two phases of the fluid sample, such that the phase information includes information about a property of the boundary between the two phases, i.e., it is optional to include output channels for phases. The CNN may also include several output channels for providing information about several properties of the boundary between the two phases or respective boundaries between several phases.

The phase information includes information about a property of the boundary between the two phases. In this embodiment, the phase information includes a strength of the boundary between the two phases 16 and 18, as well as a number of, types of, and volumes of the phases 16, 18, and 22. The CNN in addition to the superimposed image uses information about the configuration of the phase analysis system, including imaging conditions for obtaining the images superimposed to generate the superimposed image, camera resolution, camera to fluid sample distance, vial form, vial size, etc. for determining the types and volumes of each of the phases 16, 18, and 20.

The information about the property of the boundary between the two phases may also include, for example, a height of the boundary between the two phases of the fluid sample, a volume of the boundary between the two phases of the fluid sample, and a type of the boundary between the two phases of the fluid sample. Furthermore, the phase information may include one or more gradients in one or more of the phases of the fluid sample, a turbidity of the fluid sample, a turbidity at a specific position of the fluid sample, a position of one or more interfaces between different phases of the fluid sample, a height of one or more of the phases of the fluid sample, and a bubble size distribution in case that one of the phases of the fluid sample is a foam.

In other embodiments, the phase information may also be derived based on the data driven model and at least one image of the fluid sample including the phase information of the fluid sample without generating a superimposed image or selecting optimal images.

The phase analysis system 10 may be used for various optimisation activities, for example, optimising a property of the fluid sample, such as a foam volume, a foam height, a phase stability, or a shelf life of the fluid sample. Therefore, the dual arm 26 may automatically exchange fluid samples by replacing the vial with another fluid samples with another formulation, e.g., changed salinity. The phase analysis system 10 may also be used for monitoring the fluid sample over time, e.g., for analysing an evolution of the fluid sample over time or monitoring emulsion-polymerisation during a reaction within the fluid sample. This allows obtaining phase information over time, e.g., for monitoring changes of volumes of phases over time.

Figure 2:
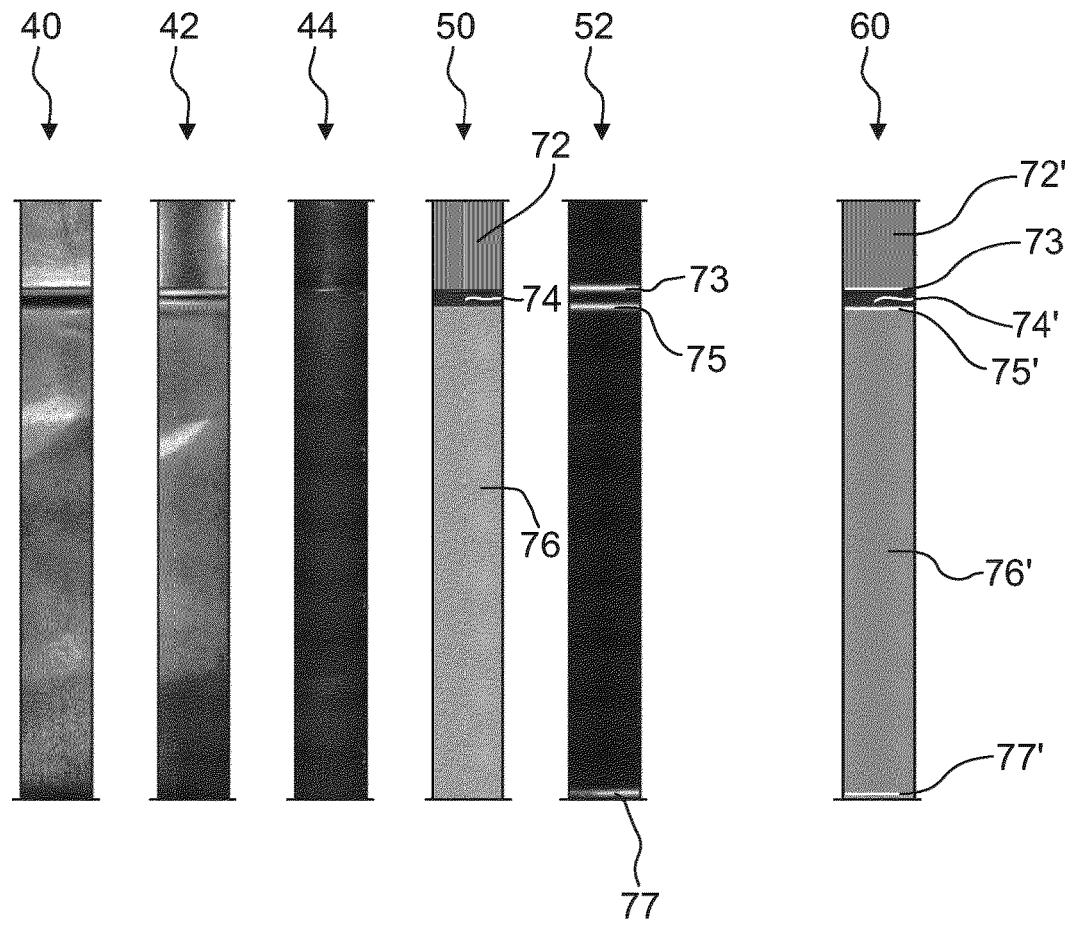
FIG. 2 shows exemplarily three images of a first fluid sample obtained at different imaging conditions, two graphs of labeled data with phase information of the first fluid sample as derived by a data driven model, and a graph of labeled data provided by a human user for the first fluid sample for comparison.

FIG. 2 shows images 40, 42, and 44 and graphs of labeled data 50, 52, and 60 of a first fluid sample 200 in a detail of a vial. The images 40, 42, and 44 are superimposed images generated using HDRI on a series of 12 images, i.e., they are HDR images. Image 40 is obtained in transmission configuration. Image 42 is obtained in stray configuration. Image 44 is obtained in remission configuration. The graphs of the labeled data 50, and 52 include phase information which is derived by the CNN of the phase analysis system 10. The images 40, 42, and 44 are used as inputs to the CNN and the graphs of labeled data 50 and 52 are provided based on the output of the CNN. In other embodiments, only one or two of the images 40, 42, and 44 may be used as input to the CNN. Graph of labeled data 50 is derived by the output channels for phases and graph of labeled data 52 is derived by the output channels for boundaries. The labeled data 60 is labeled by a human user.

The graph of labeled data 50 shows different types of phases 72, 74, and 76. Phase 72 corresponds to an air phase, i.e., an empty headspace of the vial, meaning a headspace which does not contain fluid sample 200. Phase 74 corresponds to a surface phase. Phase 76 corresponds to a turbid phase.

The graphs of labeled data 52 shows a boundary 73 between the phases 72 and 74 shown in graph of labeled data 50, as well as a boundary 75 between the phases 74 and 76 shown in graph of labeled data 50, and boundary 77 below phase 76 and a part of the fluid sample 200 which is outside the detail shown in graph of labeled data 50. The strengths of the boundaries 73, 75, and 77 are presented by showing a respective thickness of the boundaries 73, 75, and 77. However, a strength, for instance, a recognizability or distinctness of the boundary, can also be presented by the contrast of a representation of the boundaries 73, 75, and 77. For example, a white boundary can refer to a clearly recognizable boundary, black to clearly no recognizable boundary and shades of grey can represent different measures for the recognisability of the boundary. The graphs of labeled data 52 may be post processed, e.g., by consolidating the boundaries, for example, based on comparing the output of the output channel for the boundaries with the output of the output channels for the phases. This allows checking, whether positions of the boundaries 73, 75, and 77 are in correspondence with positions of the phases 72, 74, and 76. Alternatively, or additionally, the image of the graphs of labeled data 52 may be post processed, e.g., using image processing and filtering for improving the image, for example, by using mathematical morphology.

The graph of labeled data 60 shows the phases 72', 74', and 76' of which the same reference signs with prime correspond to the respective reference signs of the graph of labeled data 50. Furthermore, the graph of labeled data 60 shows the boundaries 73', 75', and 77'. The graph of labeled data 60 was generated based on visual inspection by a human user which provided vertical positions of the phases 72', 74', and 76', as well as respective types of the phases. Furthermore, the human user provided vertical positions of the boundaries 73', 75', and 77'. The positions and types of the phases, as well as the boundaries derived by the CNN are in good agreement with the graph of labeled data 60 provided by the human user.

Figure 3:
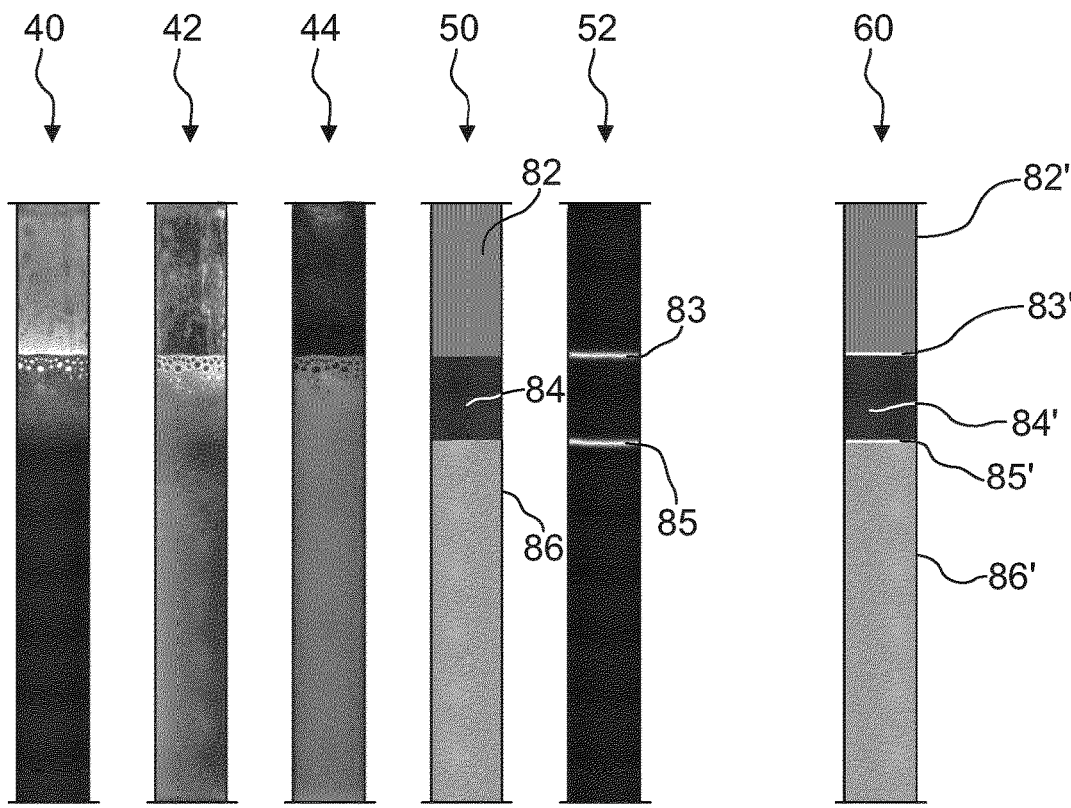
FIG. 3 shows exemplarily three images of a second fluid sample obtained at different imaging conditions, two graphs of labeled data with phase information of the second fluid sample as derived by a data driven model, and a graph of labeled data provided by a human user for the second fluid sample for comparison.

FIG. 3 shows HDR images 40, 42, and 44 and graphs of labeled data 50, 52 and 60 of a second fluid sample 300. The images and graphs are generated as described with respect to FIG. 2 albeit for a different fluid sample 300 instead of fluid sample 200.

The graph of labeled data 50 shows different types of phases 82, 84, and 86. Phase 82 corresponds to an air phase. Phase 84 corresponds to a foam phase, i.e., a phase formed by bubbles or air droplets, respectively. Phase 86 corresponds to a turbid phase.

The graphs of labeled data 52 show a boundary 83 between the phases 82 and 84 shown in graph of labeled data 50, and a boundary 85 between the phases 84 and 86 shown in graph of labeled data 50. The strengths of the boundaries 83 and 85 are presented by showing a respective thickness of the boundaries 83 and 85.

The graph of labeled data 60 shows the phases 82', 84', and 86' of which the same reference signs with prime correspond to the respective reference signs of the graph of labeled data 50. Furthermore, the graph of labeled data 60 shows the boundaries 83' and 85'. The graph of labeled data 60 was generated based on visual inspection by a human user. Also for the fluid sample 300, there is a good agreement between the positions and types of the phases and the boundaries derived by the CNN compared to the graph of labeled data 60 provided by the human user.

Figure 4A:
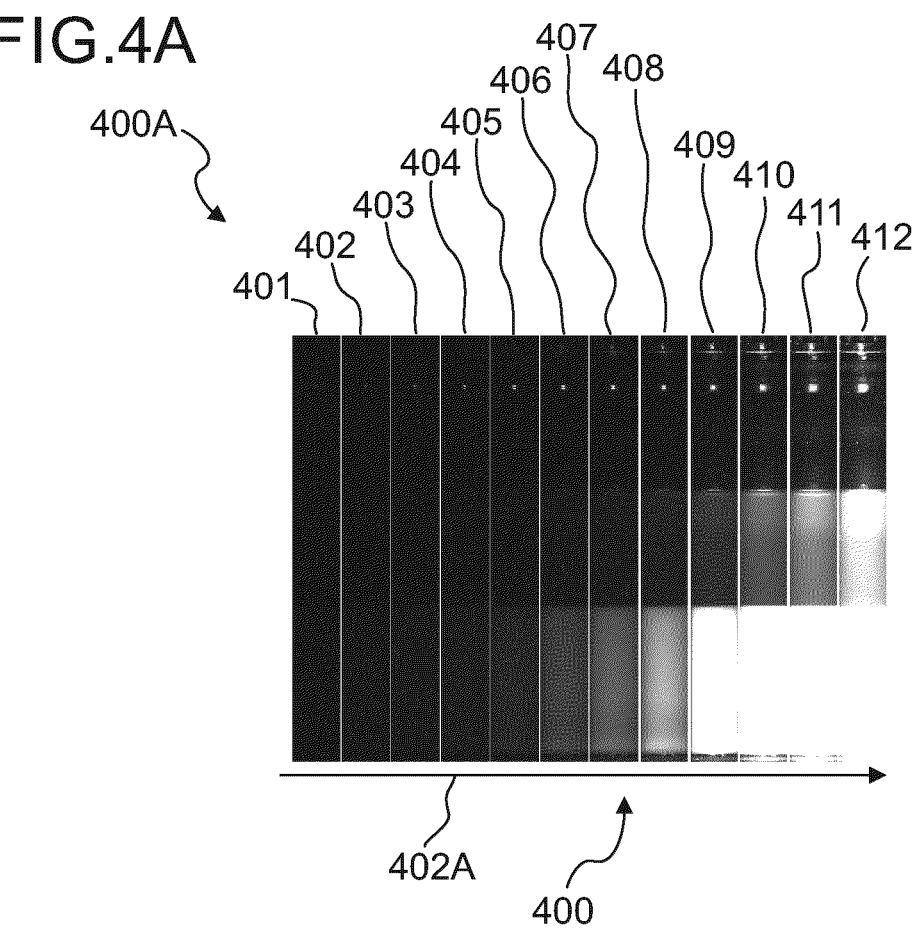
FIG. 4A shows exemplarily 12 images of a third fluid sample obtained in transmission direction at different exposure times.

FIG. 4A shows a series 400A of 12 images 401, 402, 403, 404, 405, 406, 407, 408, 409, 410, 411, and 412 of a third fluid sample 400 obtained in transmission direction at different exposure times 402A and otherwise identical imaging condition. The 12 images 401, . . . , 412 of the series 400A or a subset of the images, e.g., images 405 to 412, of the series 400A after selecting optimal images with optimal contrast, may be superimposed in order to generate a superimposed image containing the information of the individual images 401, . . . , 412.

Figure 4B:
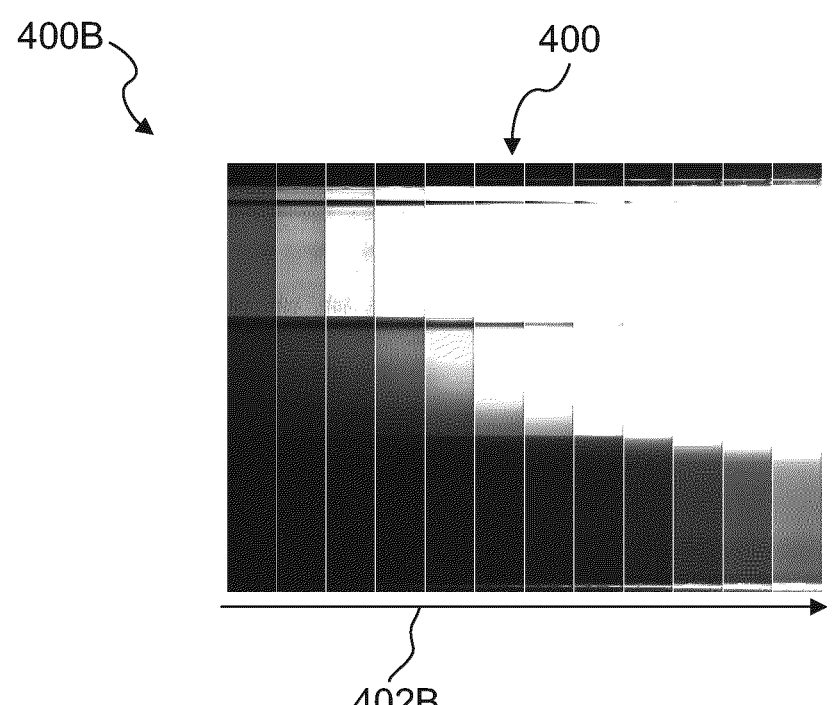
FIG. 4B shows exemplarily 12 images of the third fluid sample obtained in reflection direction at different exposure times.

FIG. 4B shows a series 400B of 12 images of the third fluid sample 400 obtained in reflection direction, i.e., remission configuration, at different exposure times 402B and otherwise identical imaging conditions. Also these images may be superimposed to generate a superimposed image.

Figure 5:
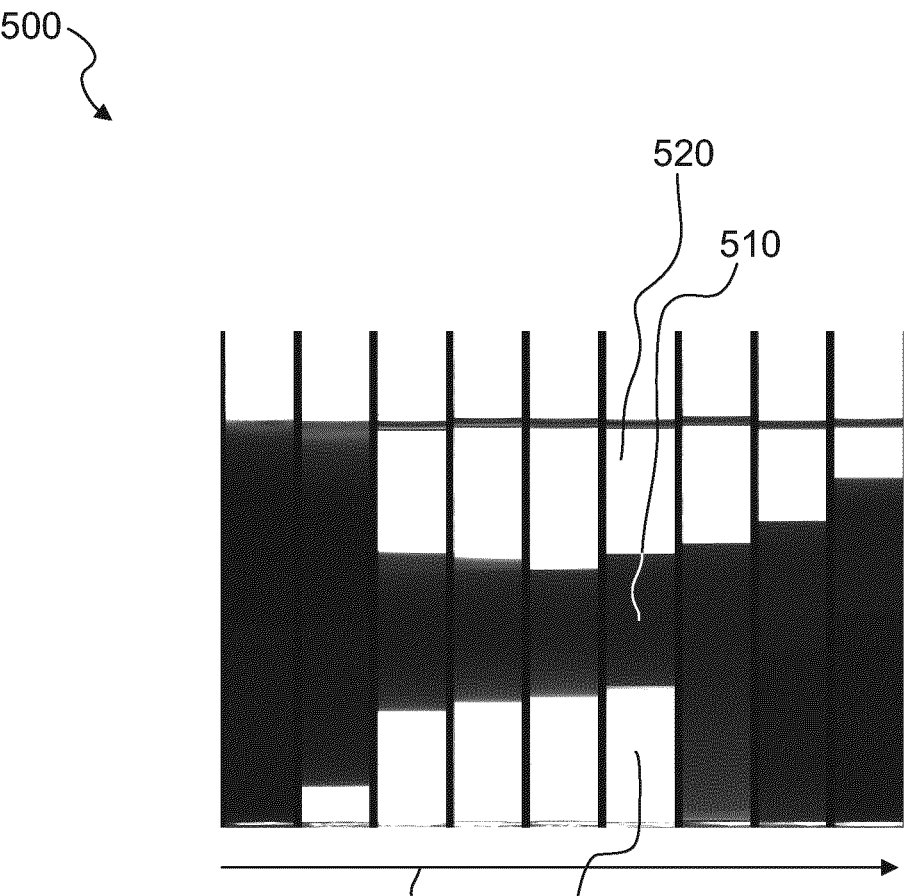
FIG. 5 shows exemplarily a process of enhanced oil recovery based on analysing 9 images of a fourth fluid sample with different salinities obtained at identical imaging conditions.

FIG. 5 shows exemplarily a process of enhanced oil recovery based on analysing 9 images of a fourth fluid sample 500 with different salinities 502 obtained at identical imaging conditions. Fluid sample 500 includes a three phase system with a microemulsion phase 510, a hydrocarbon phase 520, and a water phase 530. A phase separation of the three phases 510, 520, and 530 is desired. The microemulsion phase 510 has a low interfacial tension and can separate the hydrocarbon phase 520 from the water phase 530 in dependence of a salinity 502 in the fluid sample 500. In order to separate the phases 510, 520, and 530, salinity 502 in the fluid sample 500 is adjusted for finding an optimal stability of the microemulsion phase 510 which allows the separation of hydrocarbons from the water.

Figures 6A, 6B:
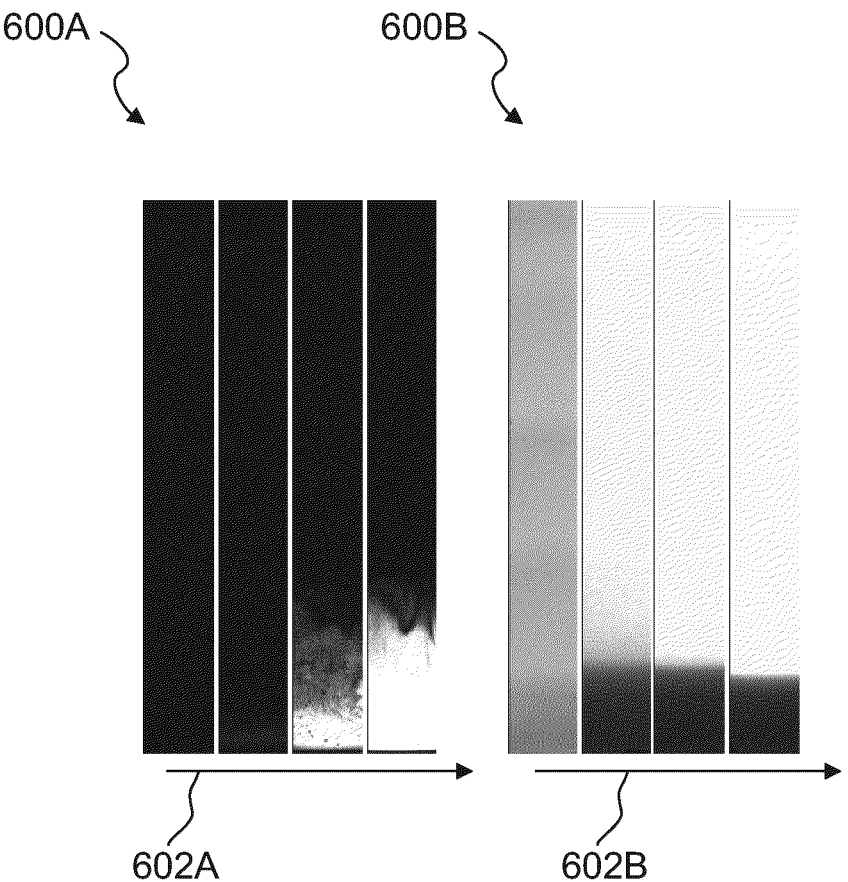
FIG. 6A shows exemplarily a process of optimizing a stability of polyol blends based on 4 images of a fifth fluid sample at different points in time obtained at identical imaging conditions.
FIG. 6B shows schematically and exemplarily a process of optimizing a stability of polyol blends based on 4 images of a sixth fluid sample at different points in time obtained at identical imaging conditions.

FIG. 6A shows exemplarily a process of optimizing a stability of polyol blends based on 4 images of a fifth fluid sample 600A at different points in time 602A obtained at identical imaging conditions. FIG. 6B shows another exemplary process of optimizing the stability of polyol blends based on 4 images, in this case of a sixth fluid sample 600B at different points in time 602B obtained at identical imaging conditions. For optimizing stability of polyol blends, a mixture of polyols with additives is used as fluid sample 600A and 600B, respectively. The concentrations of the polyols and the additives in the fluid sample 600A and 600B, respectively, are optimized in order to increase a shelf life of the fluid sample 600A and 600B, respectively, i.e., stability of homogeneity of the mixture of polyols with additives overtime. Without a stable polyol blend no homogeneous polyurethane may be provided.

Figure 7:
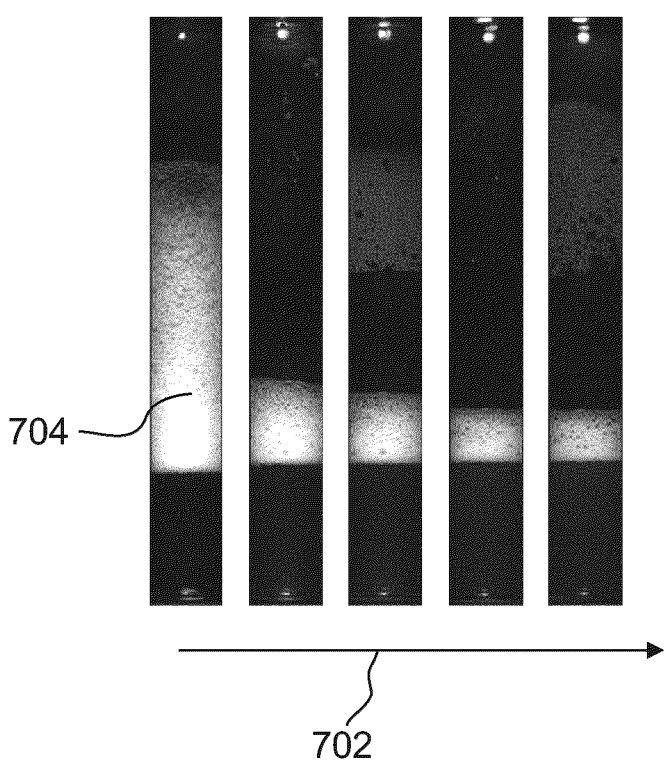
FIG. 7 shows exemplarily a process of optimizing foam stability based on 5 images of a seventh fluid sample with different oil loads obtained at identical imaging conditions.

FIG. 7 shows exemplarily a process of optimizing foam stability based on 5 images of a seventh fluid sample 700 with different oil loads 702 obtained at identical imaging conditions. For optimizing foam stability provided based on fluid samples including a detergent composition including an oil load 702, such as wash detergents or shampoos, oil load 702 may be adjusted for optimizing stability of the foam. The volume of a foam phase 704 may be monitored over time and in dependence of the oil load 702 in the detergent composition. This may allow to optimize the stability of the foam by optimizing the detergent composition, in particular, the oil load 702.

Figure 8:
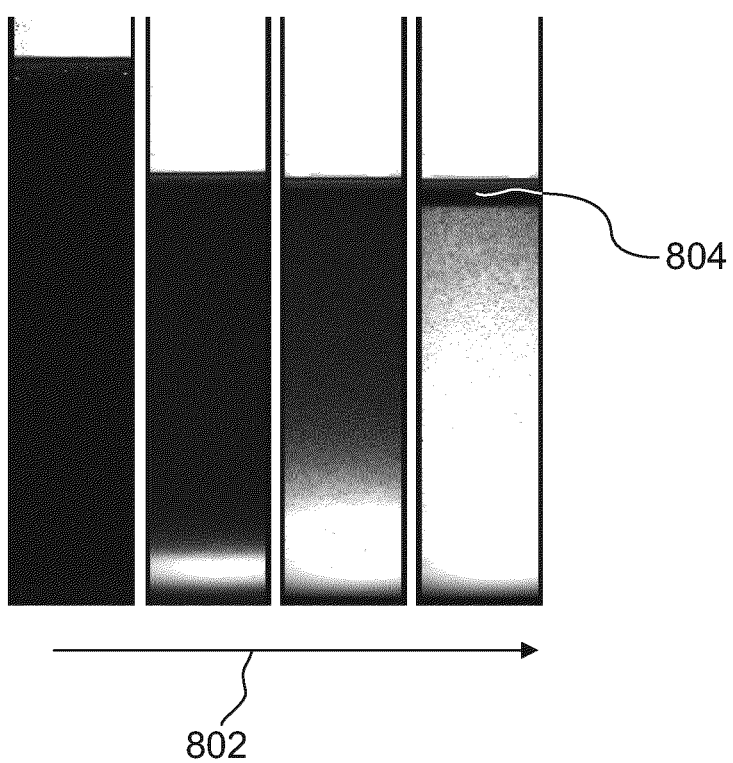
FIG. 8 shows exemplarily a process of optimizing defoamer performance based on 4 images of an eighth fluid sample at different points in time obtained at identical imaging conditions.

FIG. 8 shows exemplarily a process of optimizing defoamer performance based on 4 images of an eighth fluid sample 800 at different points in time 802 obtained at identical imaging conditions. For optimizing defoamer performance for paints, a paint with additives is used as fluid sample 800. The additives support paints to release air after mixing them. The concentration of the paint and additives in the fluid sample 800 are optimized in order to optimize release of air. A transparency of a top phase 804 in the fluid sample 800 may be used as indicator for trapped air, i.e., a higher transparency indicates improved release of air.

Figure 9:
FIG. 9 shows a schematic flow diagram of an embodiment of a method for determining phase information of a fluid sample.
Figure 9:
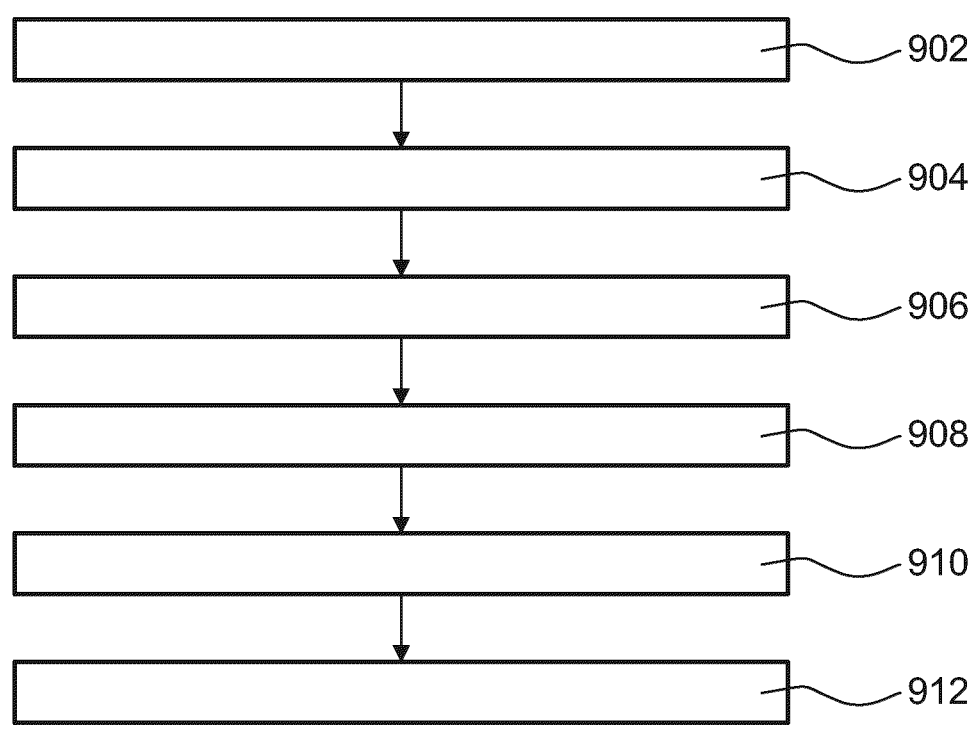

FIG. 9 shows a schematic flow diagram of an embodiment of a method 900 for determining phase information of a fluid sample. The method may be a computer implemented method. The method may be used for operating a phase analysis system, e.g., the phase analysis system presented in FIG. 1. The method may be used for monitoring and/or controlling phase separation in chemical processes and samples, namely fluid samples.

In step 902, 12 images of the fluid sample are obtained at different exposure times for otherwise identical imaging conditions. In other embodiments, at least one image of the fluid sample including the phase information of the fluid sample may be obtained. Step 902 is optional, the images of the fluid sample may also be obtained by another process and provided for analysing them in order to determine phase information of the fluid sample.

In step 904, the images are provided to a processing system, e.g., the phase analysis system, for determining phase information of the fluid sample based on the obtained images.

In step 906, a subset of the 12 images with an optimal contrast is selected of the 12 images for further processing them. Step 906 is optional.

In step 908, a superimposed image is generated by superimposing the subset of the images of the fluid sample. In this embodiment, HDRI techniques are used for superimposing the subset of images, such that a HDR image is generated as superimposed image which includes more information as each of the individual images.

In step 910, a data driven model in form of a CNN is provided. The CNN comprises output channels for the phase information. In this embodiment, the CNN is a single model which comprises output channels for types of phases and strength of the boundaries between the phases, i.e., the phase information includes information regarding the type of the phases and information about the property of the boundaries between phases in form of strength of the respective boundary.

In step 912, the phase information of the fluid sample is derived by inputting the superimposed image into the CNN and providing the output of the CNN. The CNN provides classifications of the types of the phases and of the strength of the boundaries, e.g., as presented in FIG. 2 and FIG. 3.

In other embodiments, the method may include one or more of the following:

providing at least two images of the fluid sample obtained at different imaging conditions, causing a light source to provide incident light to the fluid sample, causing an image sensor to provide the one or more images of the fluid sample, providing the at least one image of the fluid sample including the phase information of the fluid sample based on the one or more images of the fluid sample provided by the image sensor, and training the data driven model based on labeled training data of fluid samples. The labeled training data may include the phase information of the fluid samples.

The method may, for example, be used for monitoring a fluid sample or for obtaining the phase information. The phase information obtained by the method may be used for optimizing a property of the fluid sample, such as a foam height, a foam volume, a shelf life, or a phase stability of the fluid sample. The phase information may also be used for other optimisation activities.

Figure 10:
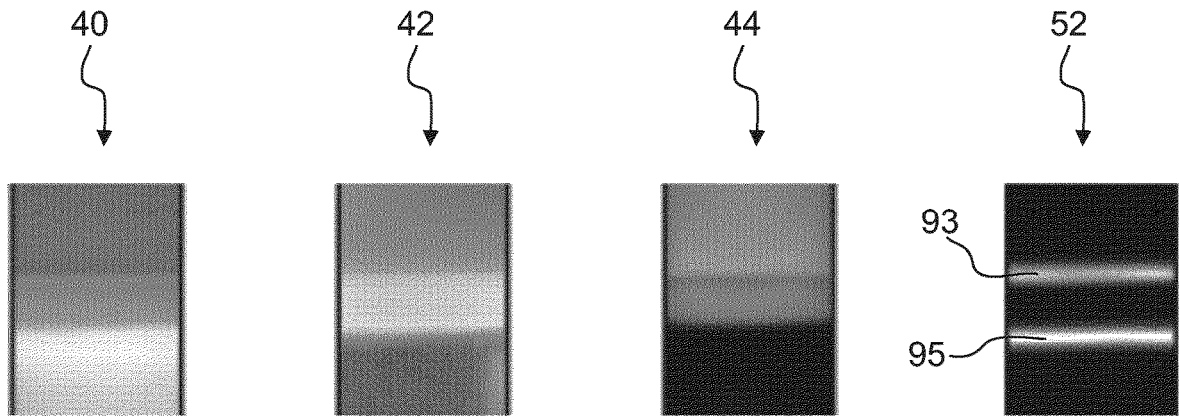
FIG. 10 shows exemplarily three images of a ninth fluid sample obtained at different imaging conditions, and a graph of labeled data with phase information of the ninth fluid sample in form of a weaker boundary and a stronger boundary as derived by the data driven model.
Figure 10:
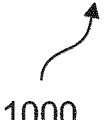

FIG. 10 shows images 40, 42, and 44 and graph of labeled data 52 of a ninth fluid sample 1000 in a detail of a vial. Images 40, 42, and 44 are obtained at different imaging conditions. Graph of labeled data 52 is derived by a CNN comprising an output channel for classifying a boundary of the fluid sample 1000, such that the phase information includes information about a property of the boundary. The three images 40, 42, and 44 are used as input to the CNN and the graph of labeled data 52 is generated as output of the CNN. In other embodiments, also only one of the images may be used as input to the CNN.

In this case, the property is a strength of the boundary indicated by a coloring of the respective boundaries 93 and 95. Graph of labeled data 52 provides the phase information of the fluid sample 1000 in form of a weaker boundary 93 and a stronger boundary 95. Furthermore, in this case, no output channels for phases are included in the CNN.

Other variations to the disclosed embodiments can be understood and effected by those skilled in the art in practicing the claimed invention, from a study of the drawings, the disclosure, and the appended claims.

In the claims, the words "comprising" and "including" do not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program product may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to determining phase information of a fluid sample. At least one image of the fluid sample including the phase information of the fluid sample is provided. Additionally, a data driven model which comprises at least one output channel for the phase information is provided. The at least one output channel includes at least one output channel for classifying a boundary between two phases of the fluid sample, such that the phase information includes information about a property of the boundary between the two phases, such as a height, a volume, a type, or a strength of the boundary. The phase information of the fluid sample is derived based on the data driven model and the at least one image of the fluid sample including the phase information of the fluid sample.

The invention claimed is:

1. A phase analysis system for determining phase information of a fluid sample, wherein the phase analysis system comprises:

a data driven model comprising at least one output channel for the phase information, wherein the at least one output channel includes at least one output channel for classifying a boundary between two phases of the fluid sample, wherein the phase information includes information about a property of the boundary between the two phases, wherein the data driven model is used for deriving the phase information of the fluid sample based on the data driven model and on at least one image of the fluid sample that comprises the phase information of the fluid sample, wherein the data driven model further comprises a single model including output channels for phases and boundaries of the phases, and wherein an output phase analysis results in output phase monitoring or control.

2. The phase analysis system according to claim 1, wherein the phase analysis system further is configured for:

generating the at least one image of the fluid sample including the phase information of the fluid sample by superimposing at least two images of the fluid sample obtained at different imaging conditions.

3. The phase analysis system according to claim 2, wherein the different imaging conditions include different exposure times and wherein the at least two images are obtained for different exposure times and otherwise identical imaging conditions.

4. The phase analysis system according to claim 2, wherein the different imaging conditions include different angles of incidence for light impinging on the fluid sample, different lighting conditions, different exposure times, or any combination thereof.

5. The phase analysis system according to claim 1, wherein the information about the property of the boundary between the two phases includes one or more of:

a height of the boundary between the two phases of the fluid sample, a volume of the boundary between the two phases of the fluid sample, a strength of the boundary between the two phases of the fluid sample, and a type of the boundary between the two phases of the fluid sample.

6. The phase analysis system according to at claim 1, wherein the phase information additionally includes one or more of:

a number of different phases of the fluid sample, a type of one or more of the phases of the fluid sample, one or more gradients in one or more of the phases of the fluid sample, a turbidity of the fluid sample, a turbidity at a specific position of the fluid sample, a position of one or more interfaces between different phases of the fluid sample, a height of one or more of the phases of the fluid sample, a volume of one or more of the phases of the fluid sample, and a bubble size distribution in case that one of the phases of the fluid sample is a foam.

7. The phase analysis system according to claim 1, wherein the data driven model comprises a single model including output channels for phases and boundaries of the phases.

8. The phase analysis system according to claim 1, wherein the data driven model is a neural network trained based on labeled training data of fluid samples, wherein the labeled training data include the phase information of the fluid samples.

9. The phase analysis system according to claim 1, wherein the phase analysis system comprises a light source, an image sensor, and a processor, wherein the light source is configured for providing incident light to the fluid sample, wherein the image sensor is configured for obtaining one or more images of the fluid sample, wherein the phase analysis system is configured for generating the at least one image of the fluid sample including the phase information of the fluid sample based on the one or more images of the fluid sample obtained by the image sensor, and wherein the processor is configured for deriving the phase information based on the data driven model and the at least one image of the fluid sample including the phase information of the fluid sample.

10. A method for determining phase information of a fluid sample, comprising:

deriving the phase information of the fluid sample based on a data driven model and on at least one image of the fluid sample including the phase information of the fluid sample, wherein the data driven model comprises at least one output channel for the phase information, wherein the at least one output channel includes at least one output channel for classifying a boundary between two phases of the fluid sample, and wherein the phase information includes information about a property of the boundary between the two phases, wherein the data driven model further comprises a single model including output channels for phases and boundaries of the phases, and wherein an output phase analysis results in output phase monitoring or control.

11. The method according to claim 10, further comprising one or more of:

generating at least two images of the fluid sample obtained at different imaging conditions, generating the at least one image of the fluid sample including the phase information of the fluid sample by superimposing the at least two images of the fluid sample, obtaining the at least two images of the fluid sample at different exposure times for otherwise identical imaging conditions, training the data driven model based on labeled training data of fluid samples, wherein the labeled training data include the phase information of the fluid samples, causing a light source to provide incident light to the fluid sample, causing an image sensor to provide one or more images of the fluid sample, generating the at least one image of the fluid sample including the phase information of the fluid sample based on the one or more images of the fluid sample provided by the image sensor, and generating the at least one image of the fluid sample including the phase information of the fluid sample as image with a highest contrast compared to other images of the fluid sample.

12. The method according to claim 10, comprising optimizing a property of the fluid sample including one or more of:

optimizing a foam volume of the fluid sample, optimizing a foam height of the fluid sample, optimizing a phase stability of the fluid sample, and optimizing shelf life of the fluid sample.

13. The method according to claim 10, comprising monitoring a fluid sample including one or more of:

monitoring emulsion-polymerisation during a reaction within the fluid sample, and monitoring evolution of the fluid sample over time.

14. A computer program product for determining phase information of a fluid sample, wherein the computer program product comprises program code means for causing a processor to carry out the method according to claim 11, when the computer program product is run on the processor.

15. A computer-readable medium having stored the computer program product of claim 14.

\* \* \* \* \*